March 13, 1956 V. E. CADWELL 2,738,083
QUICK ATTACHABLE AND DETACHABLE LOADER
Filed March 21, 1955 2 Sheets-Sheet 1
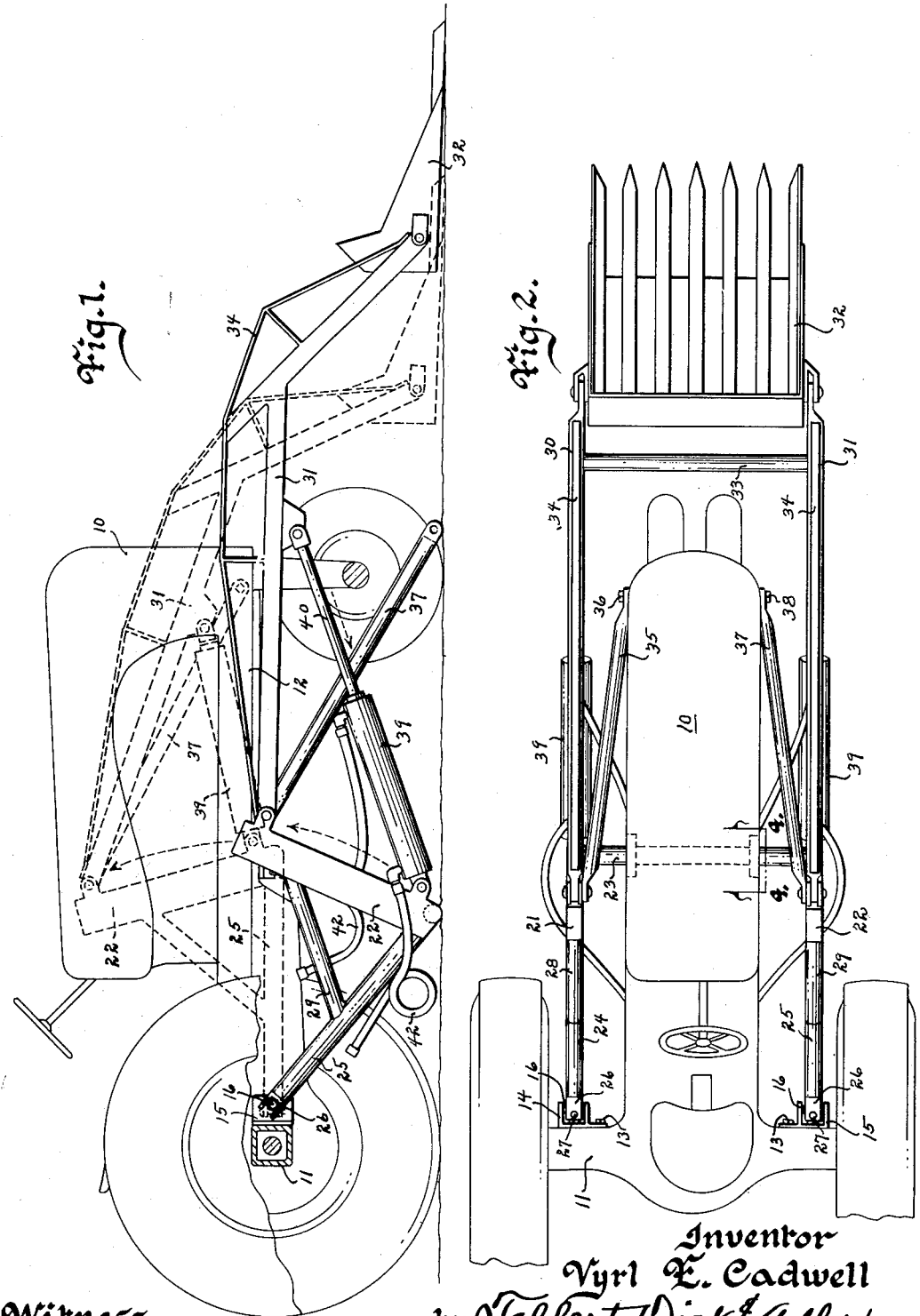
Witness
Edward P. Seeley
Inventor
Vyrl E. Cadwell
by Talbert Dick & Adler
Attorneys

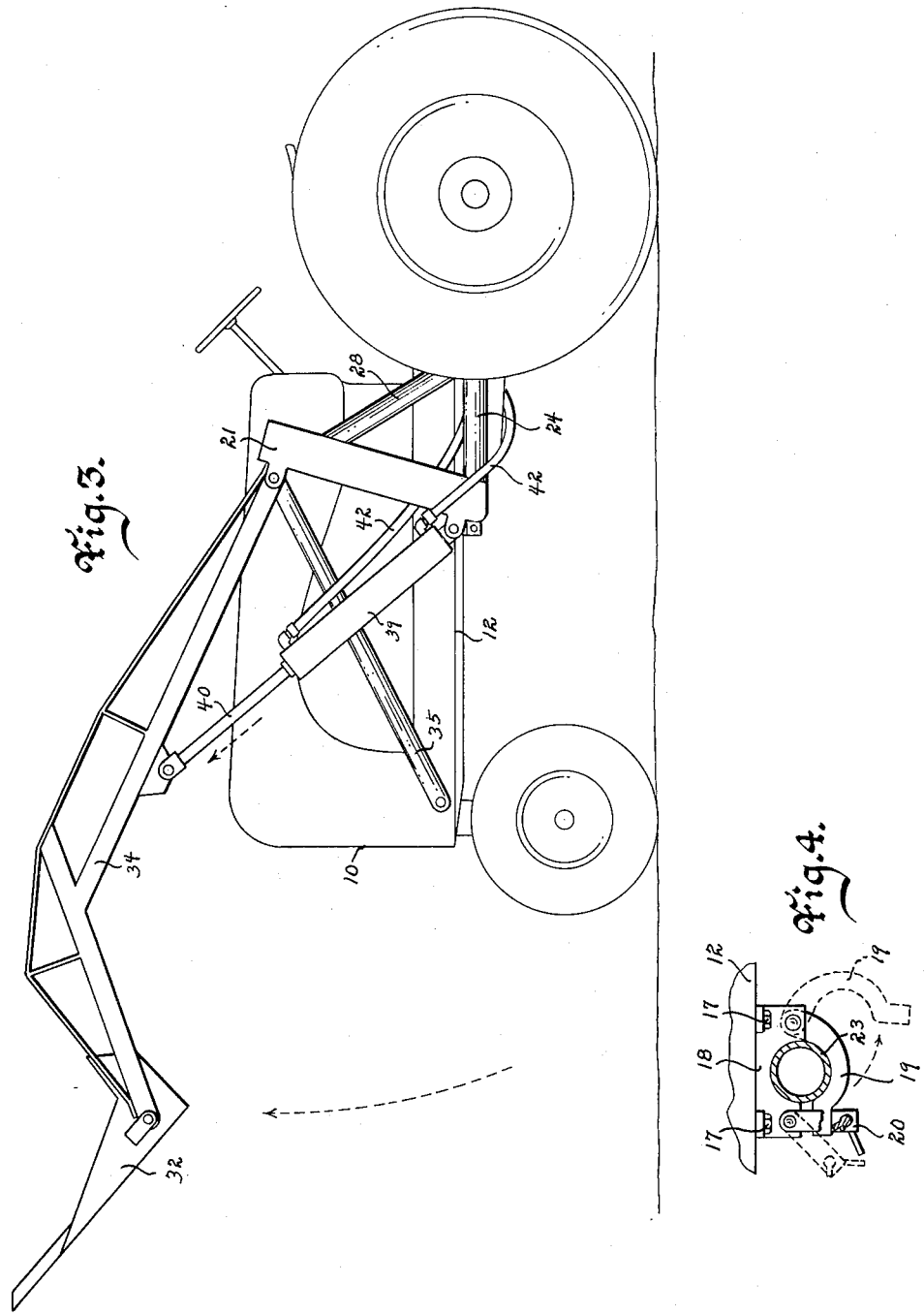

United States Patent Office 2,738,083
Patented Mar. 13, 1956

2,738,083

QUICK ATTACHABLE AND DETACHABLE LOADER

Vyrl E. Cadwell, Botna, Iowa

Application March 21, 1955, Serial No. 495,437

5 Claims. (Cl. 214—131)

This invention relates to hydraulic loaders for use on tractors and more particularly to a loader structure that permits easy and quick installation or removal.

The use of hydraulic loaders on tractors is now universal. However, in most usages, such as on farms, the tractor is used for many other purposes besides loader usage. Therefore, the loader must be frequently mounted onto the tractor and as frequently removed therefrom to free the tractor for other uses. This installation on or removal from the tractor is indeed quite a task and usually requires two or more workmen. Also the loader must be blocked up, jacked up, or power lifted into installation position on the tractor.

Therefore, one of the principal objects of my invention is to provide a loader and method of installing that requires no auxiliary installing equipment, power means, blocks or like.

A further object of this invention is to provide a loader for use on tractors that may be installed or removed easily and quickly and by only one workman.

Still further objects of this invention are to provide an easily installed or detachable loader for tractors that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a side sectional view of my loader in collapsed down condition for receiving the tractor to which it is to be attached and with broken lines illustrating its position at time of hook up, Fig. 2 is a top plan view of my loader on a tractor and more fully illustrates its construction, Fig. 3 is a side illustrative view of my tractor loader and shows its operation as a loader after it has been installed on a tractor, and Fig. 4 is an enlarged sectional side view of one of the mounting clamps and is taken on line 4—4 of Fig. 2.

In the drawings I have used the numeral 10 to generally designate an ordinary tractor having the usual rear axle housing 11, and chassis frame 12. It is to such a tractor that I employ my loader and which I will now describe in detail. On the forward side of the rear axle housing 11 and adjacent each wheel I permanently secure by bolts 13 or like the two brackets 14 and 15. Each bracket has a horizontal shaft 16. Also I permanently install two clamp brackets on the underside of the chassis and below the tractor motor as shown in Fig. 2. These two spaced apart clamp brackets are secured to the underside of the two longitudinal chassis beams by bolts 17. Each clamp bracket comprises the fixed jaw portion 18, and a complementary jaw 19 hinged to the fixed jaw portion. These two jaws, when closed, extend horizontally and are adapted to receive and hold a tubular member or brace pipe, by having a swinging and tightening latch 20 secured to the part 18 and swingable under the part 19 as shown in Fig. 4. Any other suitable quick operatable clamp bracket may be substituted for it. The numerals 21 and 22 designate two spaced apart loader frame posts, and which are substantially vertical when the loader is installed. A cross pipe 23 extends between the bottom ends of these posts. The numerals 24 and 25 designate two rearwardly extending beams secured to the lower ends of the two posts 21 and 22, respectively. On the rear free end of each of these beams is a horizontally rearwardly extending U-portion 26 adapted to receive the shafts 16 respectively of the brackets 14 and 15. A detachable vertical pin, bolt, or like 27 extends through the outer portions of each of these U-portions to hold them onto the shafts 16. A strengthening brace beam 28 extends between the part 21 and part 24. A like brace 29 extends between the part 22 and part 25. The numerals 30 and 31 designate the two shovel lifting beams hinged at their rear ends to the upper ends of the two posts 21 and 22, respectively, as shown in Fig. 2. These two lifting beams are attached in the usual way to the usual shovel or scoop element 32. The numeral 33 designates a cross brace between the two members 30 and 31, just to the rear of the shovel 32. The numeral 34 designates strengthening braces on the beams 30 and 31.

The numeral 35 designates a brace extending normally downwardly and forwardly from the top of the post 21, to the front chassis of the tractor where it is detachably secured by a bolt, cap, screw or like 36. A similar brace 37 extends from the top of the post 22 to the front end area of the tractor chassis and is secured by the bolt or like 38.

Hinged and extending from the lower end of each of the posts 21 and 22, to the respective scoop lifting beam above it, is an ordinary hydraulic jack having the usual cylinder portion 39 and piston 40. The hydraulic jacks are also hinged to the lifting beams and extend from the bottom of the posts forwardly and upwardly as shown in Fig. 1. Each hydraulic jack is adapted to be controllably operatively connected to the hydraulic pump (not shown) of the tractor by the flexible conduits 42. Normally these hydraulic jacks are used to lower and raise the scoop or shovel 32 as shown in Fig. 3. However, by my construction I use them as the power means for attaching my loader to the tractor or removing it from the tractor. This easy and quick attaching or removal of my loader is the heart of this invention and which I will now explain.

With the brackets 14 and 15 and the clamp bracket elements 18 on the tractor, and the loader resting on the ground with its shovel 32 on the ground, the lower ends of the posts 21 and 22 on the ground and with the hydraulic jacks expanded as shown in Fig. 1, the tractor is merely driven into the loader between its two posts 21 and 22. When the loader is in this condition the posts 21 and 22 will be extending upwardly and forwardly, the beams 24 and 25 will be extending upwardly and rearwardly and at least the major length of the two scoop lifting beams will extend forwardly and substantially horizontally as shown in Fig. 1.

The cross tube 33 will be adjacent the ground and extending transversely under the tractor. With the pins 27 removed, the U-members 14 and 15 will receive the shafts 16. Obviously, all the attaching procedure up to this time was merely driving the tractor into the loader as it rests on the ground in normal condition. To actually attach the loader, the pins 27 are replaced back of the shafts 16, and the hydraulic conduits 42 connected to the hydraulic source of the tractor. Next the hydraulic jacks are caused to contract, which would ordinarily lower the scoop. However, the scoop is already on the ground, so something else has to move, i. e., the posts 21 and 22 are elevated thereby bringing the cross tube into the clamps 18 and the braces 35 and 37 into position for bolting onto the forward chassis of the tractor by the bolts 36 and 38. Next the clamp jaws 19 are closed, tightened and locked and the loader is completely installed. To detach the loader the procedure is reversed. It will be noted, that no blocks, auxiliary power or auxiliary jacks or lifting cables are used. The loader's own hydraulic jacks do all the lifting and requires only one person to attach or detach my loader at will. The entire operation is simple, easy and rapid.

Once the loader has been installed, it operates just like any other loader.

In detaching the loader it is left in a position on the ground like shown in Fig. 1, and the tractor merely backed out of it. In such position, it is in ready condition to receive the tractor when it is again desired to use the loader. The broken lines of Fig. 1 show the loader after it has been secured to the tractor and is ready to be used as such.

Some changes may be made in the construction and arrangement of my quick attachable and detachable loader without departing from the real spirit and purpose of my invention, and it is my intention to cover by my claims, any modified forms of structure or use of mechanical equivalents which may be reasonably included within their scope.

I claim:

1. In a tractor loader, two spaced apart loader posts, a rearwardly extending beam on the lower end of each of said posts, a scoop lifting beam pivoted to the upper end of each of said posts and extending forwardly therefrom, a scoop secured to the forward ends of said lifting beams, a hydraulic jack hingedly secured at one end to the lower end portion of each of said posts and hingedly secured at its other end to the lifting beam above it; said hydraulic jacks extending forwardly and upwardly, a means for detachably securing the rear ends of both of said rearwardly extending beams to the rear end portion of a tractor, and means for operatively detachably securing the said two posts to a tractor; said loader elements being so associated with each other that a tractor may be driven into the loader with said scoop, and the lower ends of said posts resting on the ground and with the hydraulic jacks expanded, and after the hydraulic jacks have been operatively connected to the tractor and the rearwardly extending beams secured to the tractor, the actuating of the hydraulic jacks will raise said posts to a position for operative securement to the tractor.

2. In combination, a tractor, two spaced apart loader posts, a cross brace extending between the two lower ends of said two posts, a rearwardly extending beam on the lower end portion of each of said posts, a means for detachably securing the rear ends of said two rearwardly extending beams to the rear end of said tractor, a lifting beam pivoted to the upper end portion of each of said posts and extending forwardly, a scoop secured to the forward free ends of said two lifting beams, a hydraulic jack pivoted at one end to the lower end portions of each of the posts and with its other end pivoted to the lifting beam above it; said hydraulic jacks each extending forwardly and upwardly, a brace arm extending from the upper portion of each of said posts with its forward end detachably secured to the forward end portion of said tractor, and a means for detachably securing said cross brace to the under side of said tractor; said loader parts being so arranged that in attaching to said tractor said tractor can be driven within said loader when its scoop and the cross brace are resting on the ground with the hydraulic jacks expanded, and after the rearwardly extending braces are secured to the tractor, the contraction of the hydraulic jacks will raise said posts to a position where said cross brace and said brace arms can be detachably secured to said tractor.

3. In combination, a tractor, two spaced apart loader posts, a cross brace extending between the two lower ends of said two posts, a rearwardly extending beam on the lower end portion of each of said posts, a means for detachably securing the rear ends of said two rearwardly extending beams to the rear end of said tractor; said means comprising, a U-portion on the rear end of each of said rearwardly extending beams, shafts on the rear axle housing of said tractor for receiving said U-portions respectively, and pins extending through said U-portions for holding them detachably on said shafts, a lifting beam pivoted to the upper end portion of each of said posts and extending forwardly, a scoop secured to the forward free ends of said two lifting beams, a hydraulic jack pivoted at one end to the lower end portions of each of the posts and with its other end pivoted to the lifting beam above it; said hydraulic jacks each extending forwardly and upwardly, a brace arm extending from the upper portion of each of said posts with its forward end detachably secured to the forward end portion of said tractor, and a means for detachably securing said cross brace to the under side of said tractor; said loader parts being so arranged that in attaching to said tractor said tractor can be driven within said loader when its scoop and the cross brace are resting on the ground with the hydraulic jacks expanded, and after the rearwardly extending braces are secured to the tractor, the contraction of the hydraulic jacks will raise said posts to a position where said cross brace and said brace arms can be detachably secured to said tractor.

4. In combination, a tractor, two spaced apart loader posts, a cross brace extending between the two lower ends of said two posts, a rearwardly extending beam on the lower end portion of each of said posts, a means for detachably securing the rear ends of said two rearwardly extending beams to the rear end of said tractor, a lifting beam pivoted to the upper end portion of each of said posts and extending forwardly, a scoop secured to the forward free ends of said two lifting beams, a hydraulic jack pivoted at one end to the lower end portions of each of the posts and with its other end pivoted to the lifting beam above it; said hydraulic jacks each extending forwardly and upwardly, a brace arm extending from the upper portion of each of said posts with its forward end detachably secured to the forward end portion of said tractor, and a jaw clamp means for detachably securing said cross brace to the under side of said tractor; said loader parts being so arranged that in attaching to said tractor said tractor can be driven within said loader when its scoop and the cross brace are resting on the ground with the hydraulic jacks expanded, and after the rearwardly extending braces are secured to the tractor, the contraction of the hydraulic jacks will raise said posts to a position where said cross brace and said brace arms can be detachably secured to said tractor.

5. The method of installing a loader to a tractor, comprising, the placement of the loader frame and scoop on the ground with its hydraulic jack expanded, driving the tractor within the loader frame, securing the rear end of the frame to the rear end portion of the tractor, connecting the hydraulic jack to the hydraulic pump of the tractor, actuating the hydraulic jack to raise the loader frame up to fastening position on the tractor, and lastly securing the raised frame to the tractor.

References Cited in the file of this patent

UNITED STATES PATENTS

| | | |
|---|---|---|
| 2,417,560 | McNamara | Mar. 18, 1947 |
| 2,701,072 | Chambers et al. | Feb. 1, 1955 |